United States Patent
Moon et al.

(10) Patent No.: US 6,793,370 B2
(45) Date of Patent: *Sep. 21, 2004

(54) BACK LIGHT DEVICE

(75) Inventors: Jeong Min Moon, Kyonggi-do (KR); Ju Young Bang, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 52 days.

This patent is subject to a terminal disclaimer.

(21) Appl. No.: 10/179,298

(22) Filed: Jun. 26, 2002

(65) Prior Publication Data
US 2003/0021114 A1 Jan. 30, 2003

(30) Foreign Application Priority Data
Jul. 27, 2001 (KR) ........................................ P2001-45439

(51) Int. Cl.[7] ............................................. F21Y 113/00
(52) U.S. Cl. ........................ 362/235; 362/225; 362/260; 362/249; 362/235
(58) Field of Search ................................ 362/525, 260, 362/249, 235

(56) References Cited

U.S. PATENT DOCUMENTS

| | | | | |
|---|---|---|---|---|
| 4,184,194 A | * | 1/1980 | Shofi ............................. 362/97 |
| 5,720,546 A | * | 2/1998 | Correll je et al. ............ 362/221 |
| 6,126,297 A | * | 10/2000 | Matsui et al. ................ 362/231 |
| 6,331,064 B1 | * | 12/2001 | Nishiyama .................... 362/260 |
| 6,467,933 B2 | * | 10/2002 | Baar ............................ 362/260 |
| 6,491,411 B2 | * | 12/2002 | Itoh ............................ 362/246 |
| 6,527,414 B2 | * | 3/2003 | Moon .......................... 362/249 |

FOREIGN PATENT DOCUMENTS

KR 2002-73612 9/2002

* cited by examiner

Primary Examiner—Stephen Husar
Assistant Examiner—Anabel Ton
(74) Attorney, Agent, or Firm—Morgan, Lewis & Bockius LLP

(57) ABSTRACT

A back light device includes a plurality of light emitting lamps, upper and lower holders having a plurality of recesses in opposing surfaces for receiving opposite ends of each the plurality of light emitting lamps, conductive layers on the opposing surfaces of the upper and lower holders for supplying power to opposite ends of the light emitting lamps, a conductive material on the conductive layers, and a light diffusion system over the upper holders.

49 Claims, 18 Drawing Sheets

BACK LIGHT DEVICE

The present invention claims benefit of Korean Application No. P2001-45439 filed in Korea on Jul. 27, 2001, which are hereby incorporated by reference.

BACKGROUND OF THE INVENTION

1. Field of the Invention

The present invention relates to a back light device, and more particularly, to a back light device for a liquid crystal display.

2. Background of the Related Art

Presently, flat panel display devices have display screens of no more than a few centimeters. The devices, in particular liquid crystal display (LCD) devices, have a wide field of applications including notebook computers, monitors, spacecraft, and aircraft, for example. The LCD devices have a back light device disposed at a rear portion of the LCD panel to function as a light source. The back light device commonly includes a cylindrical fluorescent lamp arranged in either one of a direct lighting-type or a side lighting-type configuration.

The direct lighting-type back light device is problematic since a minimum gap is required to be maintained between the cylindrical fluorescent lamp and the LCD panel in order to prevent an image of the cylindrical fluorescent lamp from appearing on the LCD panel. In addition, a light diffusing system is required to provide a uniform distribution of light. Moreover, the advent of large sized display panels requires an increased light emission surface area of the back light device. Accordingly, the light emission surface area must be of an adequate thickness to prevent any deformation associated with the increased size.

The side lighting-type back light device includes the fluorescent lamp disposed along a circumference of the LCD panel and a light plate is used for diffusing light emitted from the fluorescent lamp over an entire surface of the light plate. Accordingly, the side lighting-type configured back light is problematic since the intensity of the emitted light is low. In addition, fabricating technologies are required for manufacturing the light plate in order to provide a uniform distribution of the emitted light.

Thus, the direct lighting-type back light device is commonly used in LCD devices when brightness of the emitted light is more important than an overall thickness of the LCD screen, and the side lighting-type back light device is commonly used in LCD devices when the overall thickness of the LCD screen is more important, such as a notebook personal computer or a monitor for a personal computer. Accordingly, a back light device having both high brightness and small thickness is needed.

FIG. 1 is a perspective view of a direct lighting-type back light device according to the related art. In FIG. 1, the back light device includes a plurality of light emitting lamps 1, an outside case 3 for fastening and holding the light emitting lamps 1, and an optical diffusing system 5a, 5b, and 5c arranged between the light emitting lamps 1 and an LCD panel (not shown).

A plurality of diffusion sheets and diffusion plates are disposed between the LCD panel and the plurality of light emitting lamps for preventing an image of the light emitting lamp 1 from being displayed onto a display surface of the LCD panel. A reflecting plate 7 is disposed on an inside surface of the outside case 3 for focusing the light emitted from the light emitting lamp 1 onto a display portion of the LCD panel, thereby efficiently utilizing the emitted light.

FIG. 2 is a perspective view of a light emitting lamp and a connector configuration according to the related art. In FIG. 2, the light emitting lamp 1, which is commonly referred to as a cold cathode fluorescent lamp (CCFL), has electrodes 2a and 2b formed on opposite ends inside a tube for emitting light when a power source is applied to the electrodes 2a and 2b. The opposite ends of the light emitting lamp 1 are inserted into recesses formed in both surfaces of the outside case 3. The light emitting lamp 1 includes power lines 9a and 9b connected to the electrodes 2a and 2b for providing the power source for operating the light emitting lamp 1. The power lines 9a and 9b are connected to a connector 11 that is connected to a driving circuit (not shown). Accordingly, every light emitting lamp 1 requires a separate connector 11, wherein one of power lines 9a and 9b is bent to correspond to a lower part of the outside case 3 before being connected to the connector 11.

The light emitting lamp 1 and connector 11 configuration is complicated since separate power lines 9a and 9b and connector 11 are required for each lamp. Accordingly, working efficiency and productivity decreases since more fabrication time is required to bend the power lines 9a and 9b and connect each of the light emitting lamps 1 to the connectors 11. Moreover, since the electrodes 2a and 2b must be fed through a hole formed in the outside case and attached to the connector 11, working efficiency is poor, and maintenance of the light emitting lamp is difficult.

SUMMARY OF THE INVENTION

Accordingly, the present invention is directed to a back light device that substantially obviates one or more of the problems due to limitations and disadvantages of the related art.

An object of the present invention is to provide a back light device that can be easily maintained.

Another object of the present invention is to provide a back light device that can improve light emitting lamp efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a back light device includes a plurality of light emitting lamps, upper and lower holders having a plurality of recesses in opposing surfaces for receiving opposite ends of each the plurality of light emitting lamps, conductive layers on the opposing surfaces of the upper and lower holders for supplying power to opposite ends of the light emitting lamps, a conductive material on the conductive layers, and a light diffusion system over the upper holders.

In another aspect, a back light device includes a plurality of light emitting lamps, upper and lower holders having a plurality of recesses in opposing surfaces for receiving the plurality of light emitting lamps, conductive layers on the opposing surfaces of the upper and lower holders for supplying power to the light emitting lamps, an elastic material under the conductive layers, and a light diffusion system over the upper holders.

In another aspect, a back light device includes a plurality of light emitting lamps, first and second lower holders arranged a first distance apart from each other to fit to a length of the light emitting lamps, each of the first and second lower holders having a first plurality of recesses for receiving opposite ends of the plurality of light emitting lamps, first and second upper holders arranged the first distance apart from each other, each of the first and second upper holders having a second plurality of recesses corresponding to the first plurality of recesses for fastening and holding the opposite ends of the light emitting lamps together with the first and second lower holders, conductive layers on opposing surfaces of the first and second lower and upper holders for supplying power to the light emitting lamps, and a conductive material on the conductive layers.

In another aspect, a back light device includes a plurality of light emitting lamps, first and second lower holders arranged a first distance apart from each other to fit to a length of the light emitting lamps, each of the first and second lower holders having a first plurality of recesses for receiving opposite ends of the plurality of light emitting lamps, first and second upper holders arranged the first distance apart from each other, each of the first and second upper holders having a second plurality of recesses corresponding to the first plurality of recesses for fastening and holding the opposite ends of the light emitting lamps together with the first and second lower holders, conductive layers on opposing surfaces of the first and second lower and upper holders for supplying power to the light emitting lamps, and an elastic material under the conductive layers.

In another aspect, a back light device includes a plurality of light emitting lamps, first and second lower holders arranged a first distance apart from each other to fit to a length of the light emitting lamps, each of the first and second lower holders having a first plurality of recesses for receiving opposite ends of the plurality of light emitting lamps, lower supporting parts formed between the first and second lower holders for supporting the first and second lower holders, first and second upper holders arranged the first distance apart from each other, each of the first and second upper holders having a second plurality of recesses corresponding to the first plurality of recess for fastening and holding the light emitting lamps together with the first and second lower holders, conductive layers on opposing surfaces of the first and second lower and upper holders for supplying power to the light emitting lamps, and a conductive material on the conductive layers.

In another aspect, a back light device includes a plurality of light emitting lamps, first and second lower holders arranged a first distance apart from each other to fit to a length of the light emitting lamps, each of the first and second lower holders having a first plurality of recesses for receiving opposite ends of the plurality of light emitting lamps, lower supporting parts formed between the first and second lower holders for supporting the first and second lower holders, first and second upper holders arranged the first distance apart from each other, each of the first and second upper holders having a second plurality of recesses corresponding to the first plurality of recessed for fastening and holding the light emitting lamps together with the first and second lower holders, conductive layers on opposing surfaces of the first and second lower and upper holders for supplying power to the light emitting lamps, and an elastic material under the conductive layers.

The recesses may be formed to completely pass through the upper and lower holders to hold the light emitting lamps. Or the recesses partially protrude through the upper and lower holders, and the opposite ends of the light emitting lamps do not protrude from outer surfaces of the upper and lower holders. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
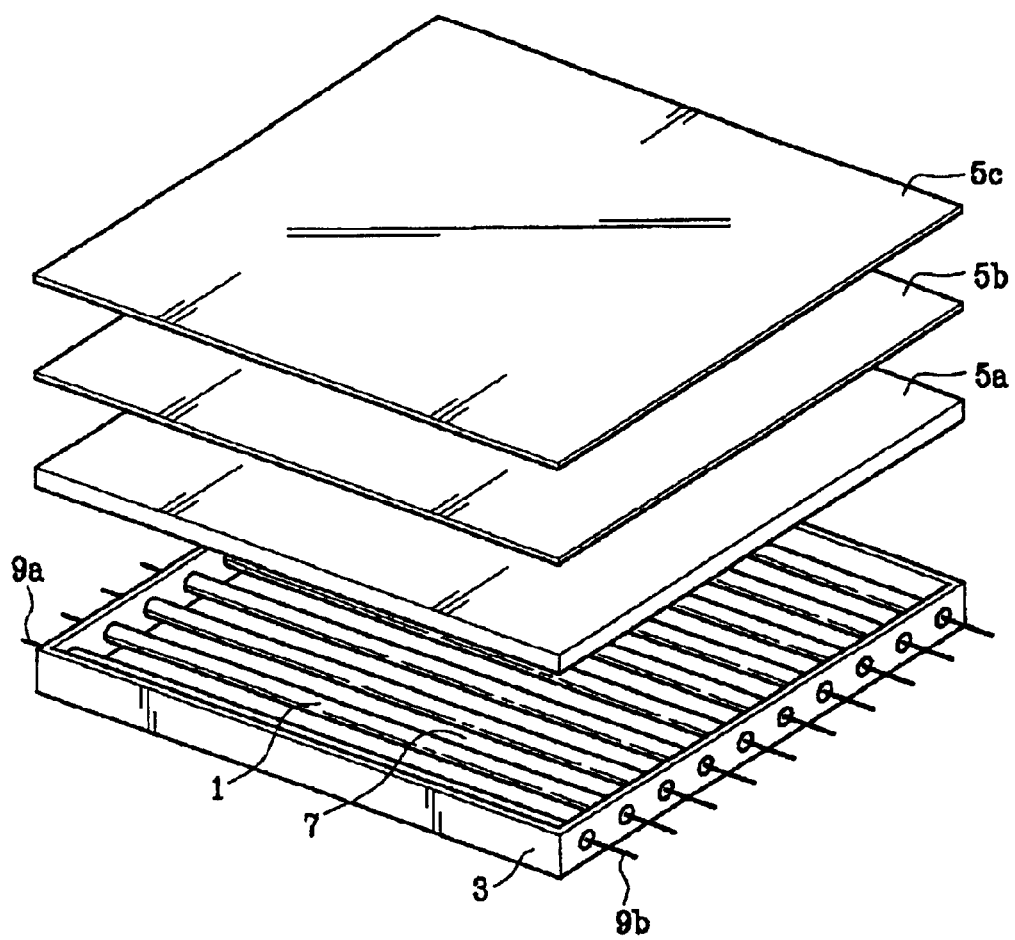
FIG. 1 is a perspective view of a direct lighting-type back light device according to the related art.
Figure 2:
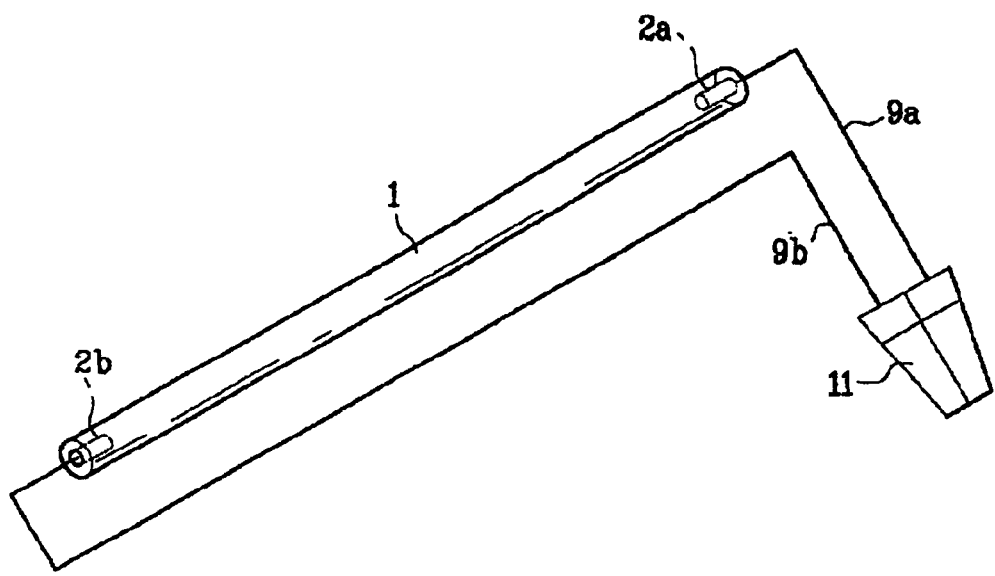
FIG. 2 is a perspective view of a light emitting lamp and a connector configuration according to the related art.
Figure 3A:
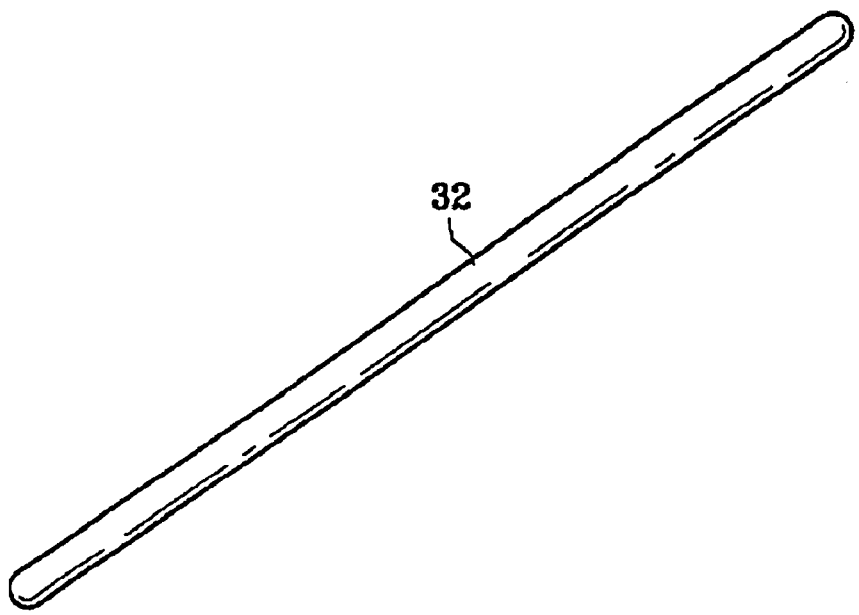
FIGS. 3A and 3B are exemplary light emitting lamps according to the present invention.
Figure 3B:
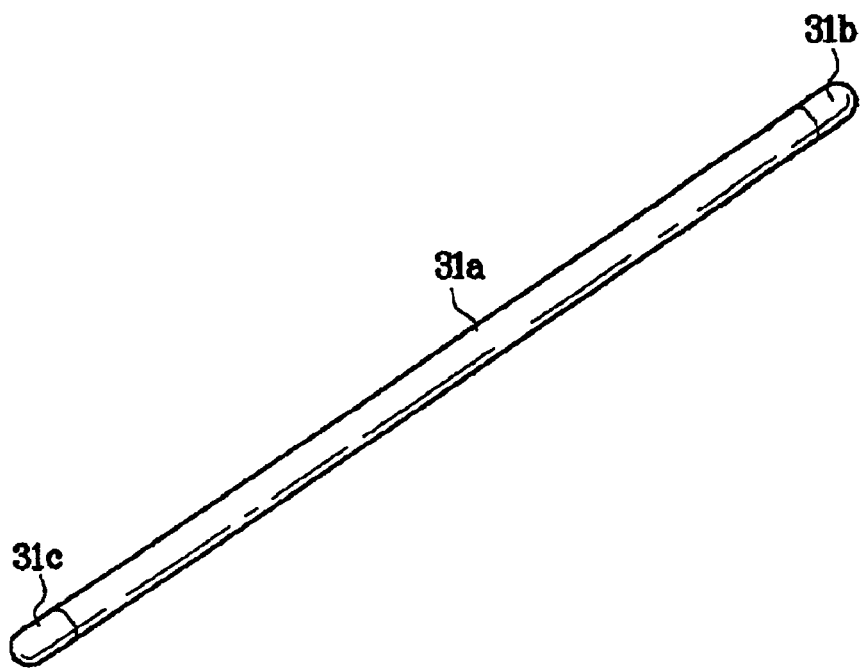

FIGS. 3A and 3B are exemplary light emitting lamps according to the present invention, and FIGS. 4A, 4B, and 4C and 4D are perspective and cross sectional views of exemplary back light devices according to the present invention. In FIG. 3A, a luminescent lamp 32 may include electrodes (not shown) formed at opposite ends inside of the luminescent lamp 32. In FIG. 3B, a luminescent lamp 31a may include electrodes 31b and 31c formed at opposite ends on outside surfaces of the luminescent lamp 31a. Accordingly, although FIGS. 4A–4D illustrate electrodeless light emitting lamps like those shown in FIG. 3A, light emitting lamps having electrodes formed on outside surfaces at opposite ends of the tube as shown in FIG. 3B are applicable. Furthermore, even though the electrodeless light emitting lamps like those shown in FIG. 3A are explained with respect to embodiments explained hereafter, the light emitting lamps having electrodes formed on outside surfaces at opposite both ends of the tube like those shown in FIG. 3B are applicable.

Figure 4A:
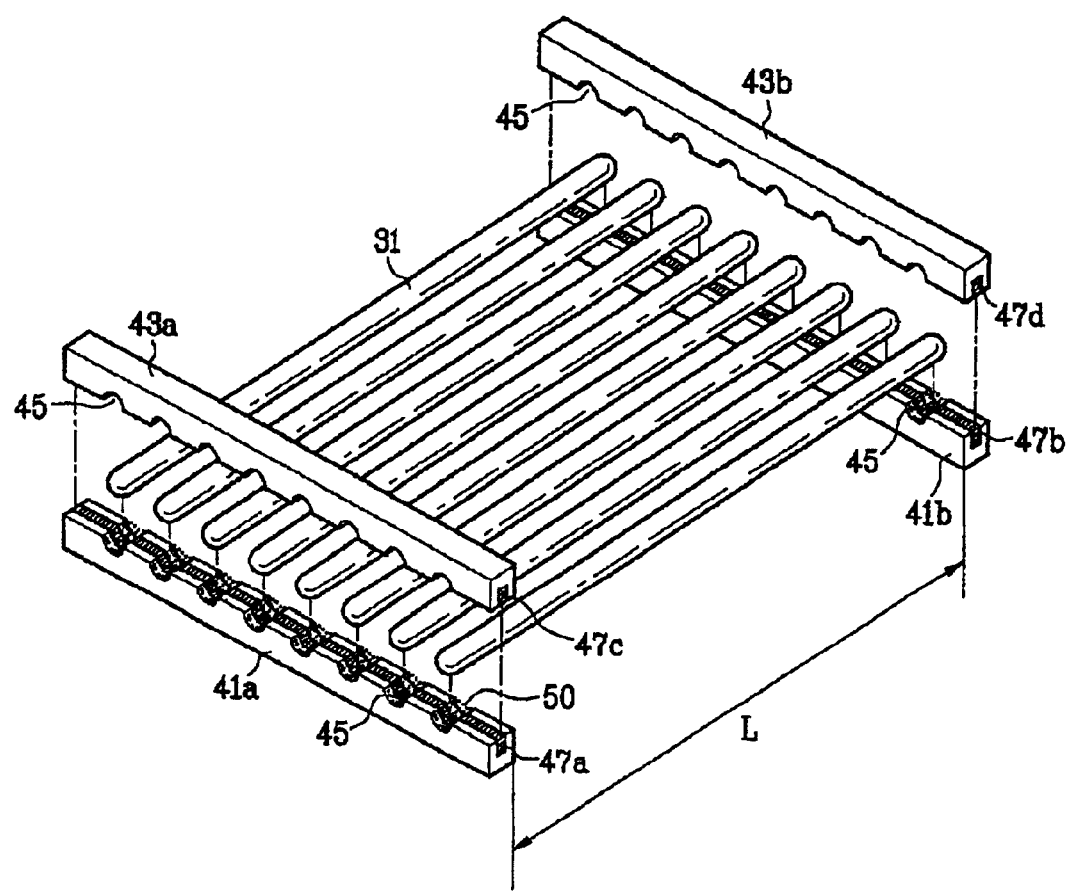
FIGS. 4A, 4B, and 4C are perspective views of exemplary back light devices according to the present invention.

In FIG. 4A, an exemplary back light device may include a plurality of light emitting lamps 31, first and second lower holders 41a and 41b, first and second upper holders 43a and 43b, conductive layers 47a, 47b, 47c, and 47d, and a conductive material 50 on the conductive layers 47a, 47b, 47c, and 47d. Each of the plurality of light emitting lamps 31 may include one of an electrodeless configuration or electrodes formed at opposite ends at outside surfaces of a tube. The first and second lower holders 41*a* and 41*b* may be spaced apart by a distance 'L' corresponding to a length of the light emitting lamps 31, and each may have a plurality of recesses 45 in a surface thereof for receiving the opposite ends of the plurality of the light emitting lamps 31. The first and second upper holders 43*a* and 43*b* may be spaced apart by the distance 'L' with the first and the second lower holders 41*a* and 41*b*, and may include the recesses 45 corresponding to the recesses 45 of the first and the second lower holders 41*a* and 41*b* for fastening and holding each of the light emitting lamps 31 in association with the first and second lower holders 41*a* and 41*b*. The conductive layers 47*a*, 47*b*, 47*c*, and 47*d* may be formed on surfaces the recesses 45 that are formed in the first and second lower and upper holders 41*a*, 41*b*, 43*a*, and 43*b*, for applying power to the light emitting lamps 31, and the conductive material 50 may be formed on the conductive layers 47*a*, 47*b*, 47*c*, and 47*d*.

The recesses 45 may be formed to completely pass through the first and second lower and upper holders 41*a*, 41*b*, 43*a*, and 43*b* to hold the light emitting lamps 31 between the first and second lower holders 41*a* and 41*b* and the first and second upper holders 43*a* and 43*b*, thereby constraining the light emitting lamps 31 along a first direction perpendicular to a lengthwise direction of the light emitting lamps 31. Each of the recesses 45 are formed to correspond to about one-half a diameter of each of the light emitting lamps 31 such that when the first and second lower and upper holders 41*a*, 41*b*, 43*a*, and 43*b* are joined together, the light emitting lamps 31 are positively affixed therebetween. Accordingly, the opposite ends of the light emitting lamps 31 may protrude from outside surfaces of the first and second lower and upper holders 41*a*, 41*b*, 43*a*, and 43*b*.

The conductive layers 47*a*, 47*b*, 47*c*, and 47*d* may be formed on interior surfaces of the recesses 45 in each of the first and second lower and upper holders 41*a*, 41*b*, 43*a*, and 43*b*. In addition, the conductive layers 47*a*, 47*b*, 47*c*, and 47*d* may be formed within a groove formed along a lengthwise direction of the first and second lower and upper holders 41*a*, 41*b*, 43*a*, and 43*b*. Alternatively, and in addition to the conductive layers 47*a*, 47*b*, 47*c*, and 47*d*, a coating of a conductive material 50 may be formed on the interior surfaces of the recesses 45. The conductive material 50 may be formed between the conductive layers 47*a*, 47*b*, 47*c*, and 47*d* and the light emitting lamps 31 to improve electrical contact therebetween, thereby improving efficiency of the light emitting lamps 31. The conductive material 50 may include liquid, gel, and powdered conductive materials, for example.

Figure 4B:
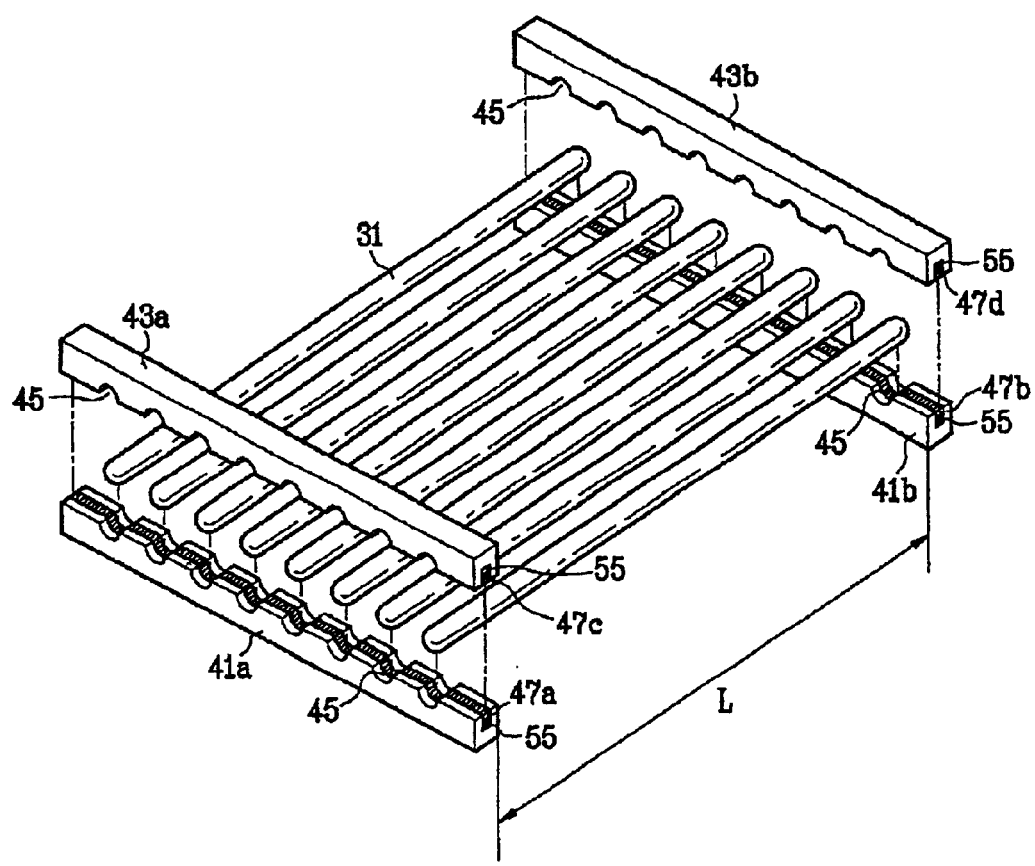
Figure 4C:
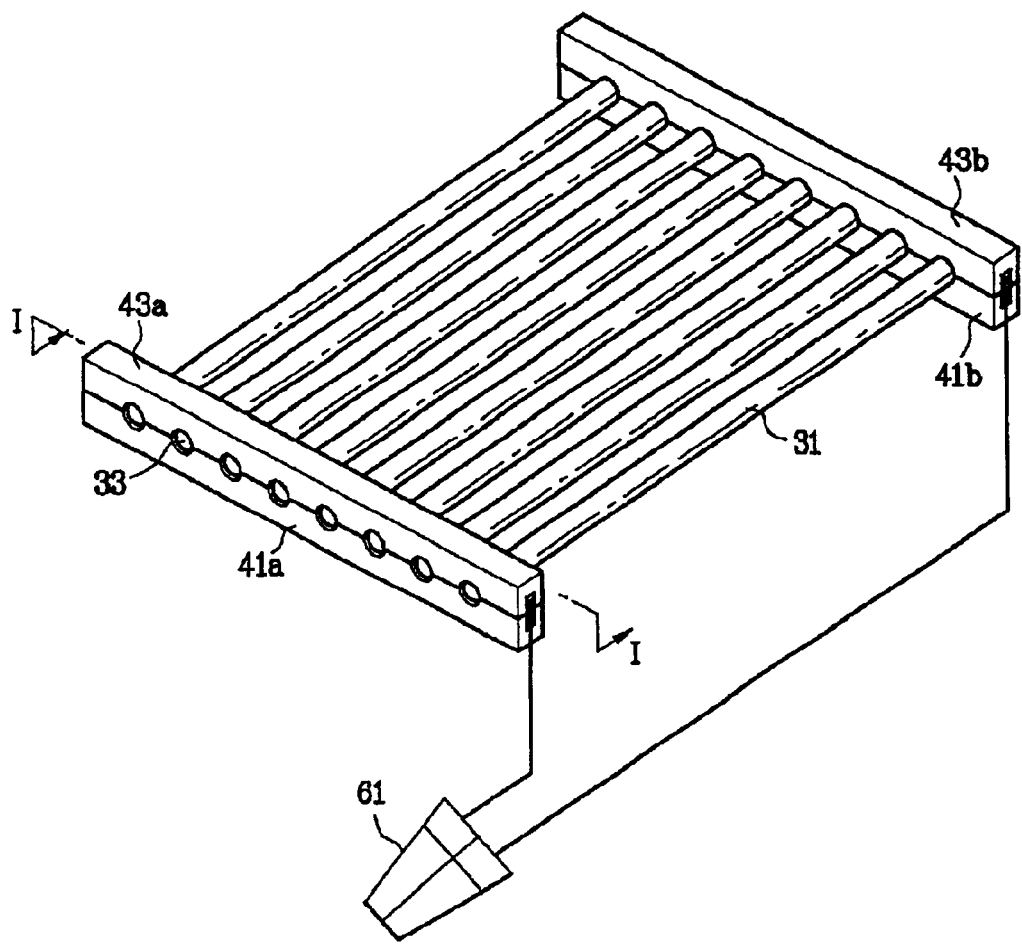

In FIG. 4B, the exemplary back light device may include a plurality of light emitting lamps 31 each having electrodeless or electrodes formed at opposite ends of the outside of a tube, first and second lower holders 41*a* and 41*b* spaced apart by a distance 'L' to fit to a length of the light emitting lamp 31 each having a plurality of recesses 45 in a surface thereof for receiving the opposite ends of the plurality of the light emitting lamps 31, first and second upper holders 43*a* and 43*b* spaced apart by the distance 'L' with the first and the second lower holders 41*a* and 41*b* and recesses 45 with the first and the second lower holders 41*a* and 41*b* for fastening and holding the light emitting lamps 31 in association with the first and second lower holders 41*a* and 41*b*, conductive layers 47*a*, 47*b*, 47*c*, and 47*d* formed on surfaces the recesses 45 are formed in the holders 41*a*, 41*b*, 43*a*, and 43*b*, for applying power to the light emitting lamps 31, and an elastic material 55 formed under the conductive layers 47*a*, 47*b*, 47*c*, and 47*d*. In FIG. 4C, an assembled back light device according to the present invention is shown. The first and second lower and upper holders 41*a*, 41*b*, 43*a*, and 43*b* may be assembled to enclose end portions 33 of the light emitting lamps 31, and a connector 61 may be connected to the conductive layers 47*a*, 47*b*, 47*c*, and 47*d*.

Figure 4D:
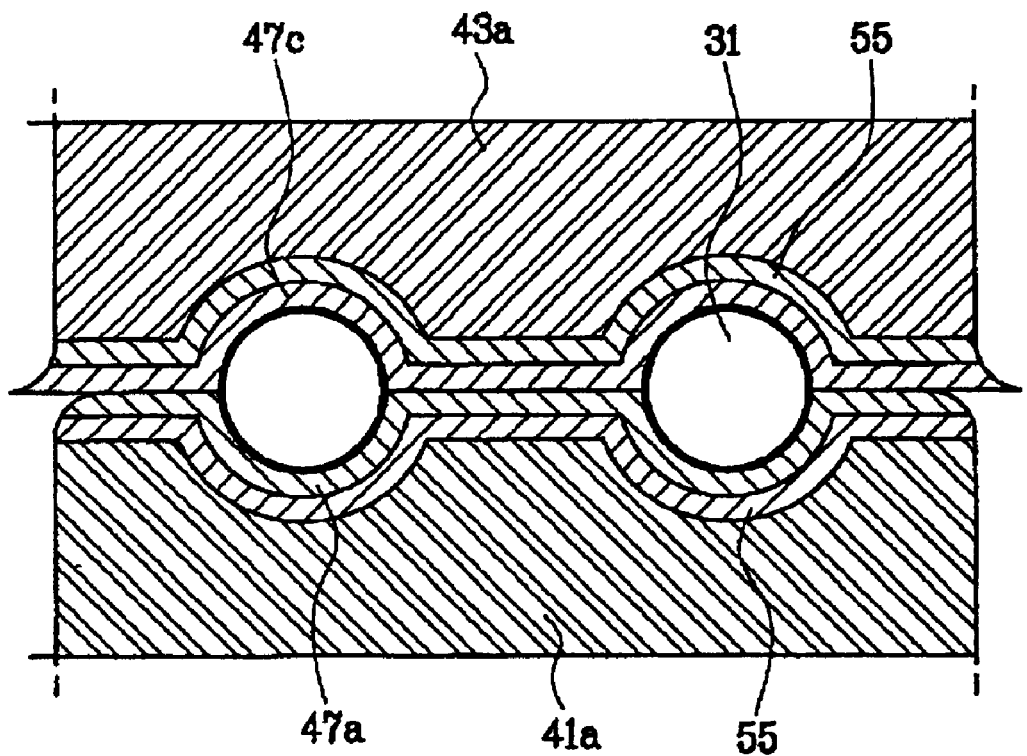
FIG. 4D is a cross sectional view along I—I in FIG. 4C.

FIG. 4D is a cross sectional view along I—I in FIG. 4C. In FIG. 4D, the elastic material 55 may serve a similar function as the conductive material 50. Accordingly, the elastic material 55 layer may be provided under the conductive layers 47*a*, 47*b*, 47*c*, and 47*d* in order to ensure intimate electrical contact with the opposite ends of the light emitting lamps 31, thereby improving efficiency of the light emitting lamps 31.

In addition, although not shown, there may be a light diffusing system disposed over the first and second upper holders 43*a* and 43*b*, thereby providing a uniform distribution of light onto a surface of the display screen of the LCD panel. The light diffusion system may include diffusion sheets and/or diffusion plates.

Figure 5A:
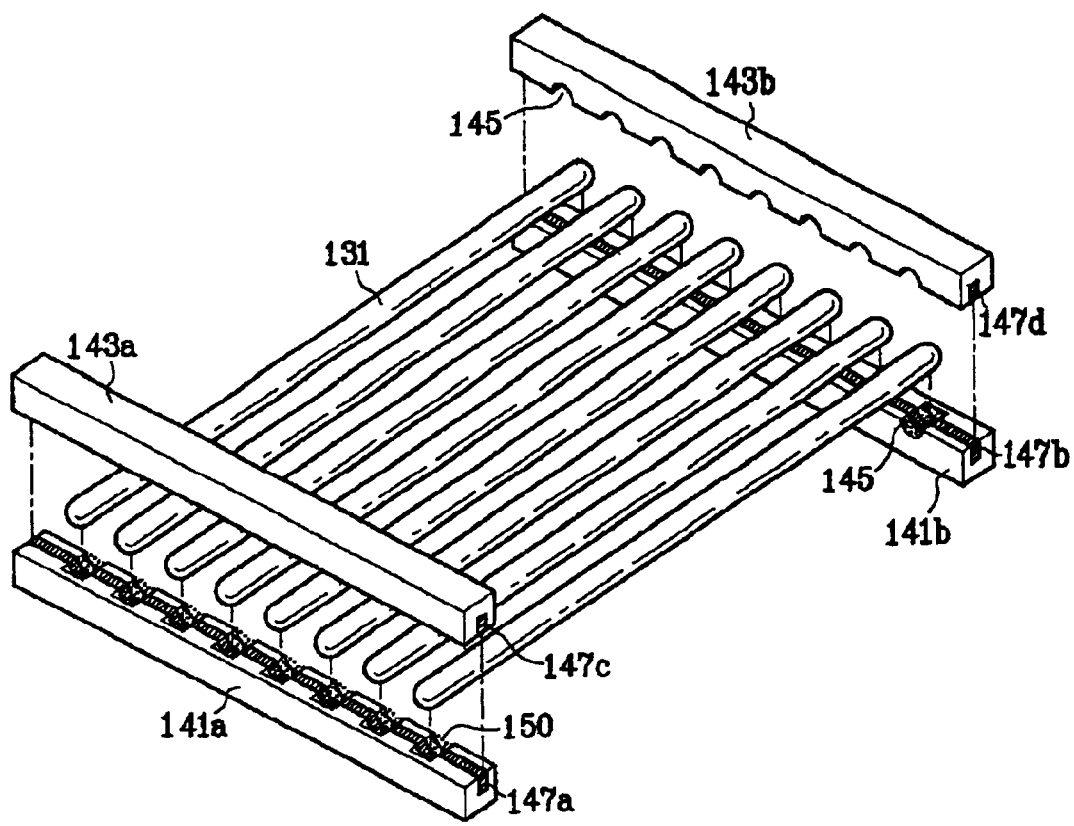
FIGS. 5A, 5B, and 5C are perspective views of other exemplary back light devices according to the present invention.
Figure 5B:
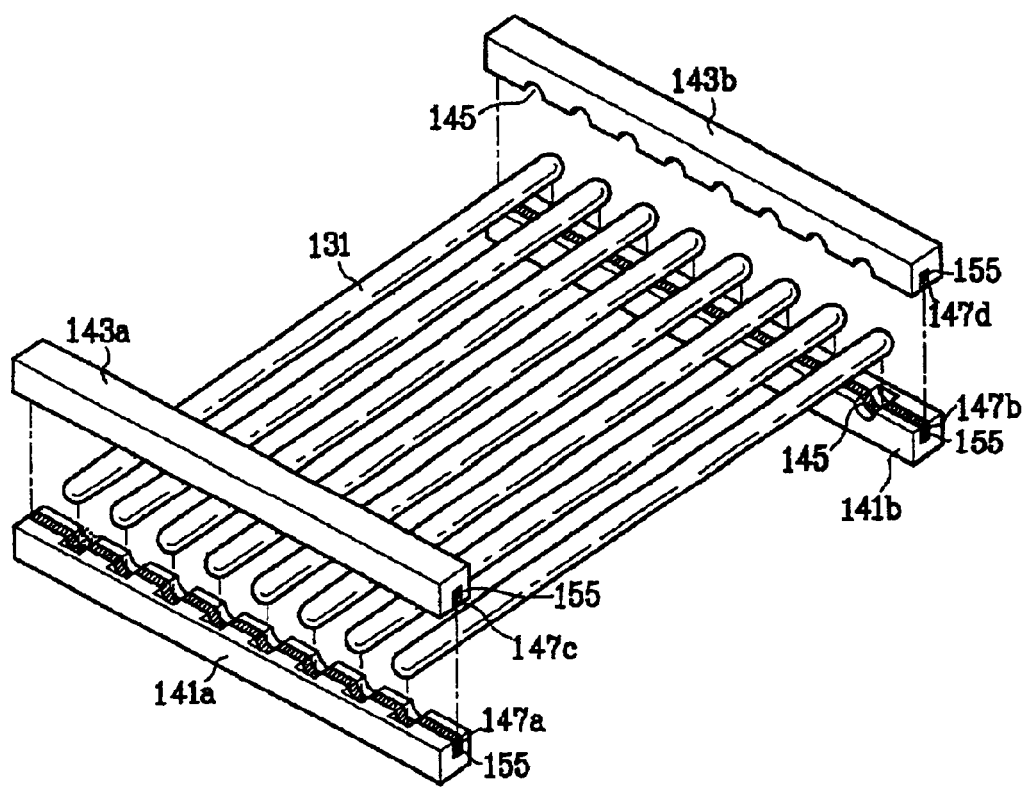
Figure 5C:
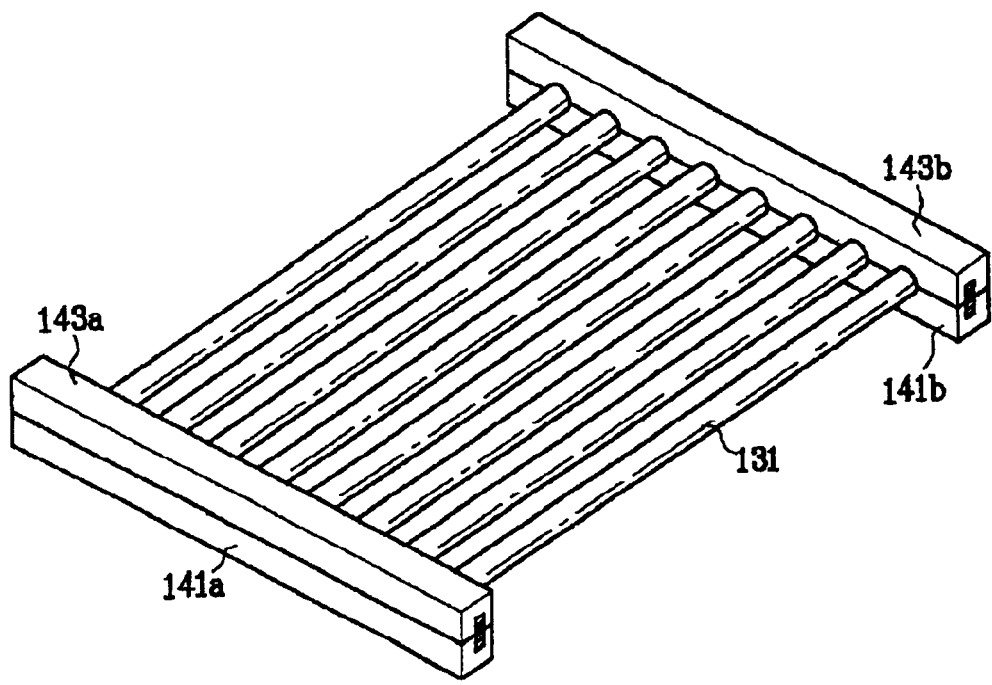

FIGS. 5A, 5B, and 5C are perspective views of other exemplary back light devices according to the present invention. In FIG. 5A, an exemplary back light device may include a plurality of light emitting lamps 131, first and second lower holders 141*a* and 141*b*, first and second upper holders 143*a* and 143*b*, conductive layers 147*a*, 147*b*, 147*c*, and 147*d*, and a conductive material 150 on the conductive layers 147*a*, 147*b*, 147*c*, and 147*d*. Each of the plurality of light emitting lamps 131 may include one of an electrodeless configuration or electrodes formed at opposite ends at outside surfaces of a tube. The first and second lower holders 141*a* and 141*b* may be spaced apart by a distance corresponding to a length of the light emitting lamps 131, and each may have a plurality of recesses 145 in a surface thereof for receiving the opposite ends of the plurality of the light emitting lamps 131. The first and second upper holders 143*a* and 143*b* may be spaced apart by the distance 'L' with the first and the second lower holders 141*a* and 141*b*, and may include the recesses 145 corresponding to the recesses 145 of the first and the second lower holders 141*a* and 141*b* for fastening and holding each of the light emitting lamps 131 in association with the first and second lower holders 141*a* and 141*b*. The conductive layers 147*a*, 147*b*, 147*c*, and 147*d* may be formed on surfaces the recesses 145 that are formed in the first and second lower and upper holders 141*a*, 141*b*, 143*a*, and 143*b*, for applying power to the light emitting lamps 131, and the conductive material 150 may be formed on the conductive layers 147*a*, 147*b*, 147*c*, and 147*d*.

The recesses 145 partially protrude through the first and second lower and upper holders 141*a*, 141*b*, 143*a*, and 143*b* to hold the light emitting lamps 131 between the first and second lower holders 141*a* and 141*b* and the first and second upper holders 143*a* and 143*b*, thereby constraining the light emitting lamps 131 along a first direction perpendicular to a lengthwise direction of the light emitting lamps 131 and along a second direction parallel to the lengthwise direction of the light emitting lamps 131. Each of the recesses 45 may be formed to correspond to about one-half a diameter of each of the light emitting lamps 131 such that when the first and second lower and upper holders 141*a*, 141*b*, 143*a*, and 143*b* are joined together, the light emitting lamps 131 are positively affixed therebetween. And the opposite ends of the light emitting lamps 131 do not protrude from outside surfaces of the first and second lower and upper holders 141*a*, 141*b*, 143*a*, and 143*b*.

The conductive layers 147a, 147b, 147c, and 147d may be formed on interior surfaces of the recesses 145 in each of the first and second lower and upper holders 141a, 141b, 143a, and 143b. In addition, the conductive layers 147a, 147b, 147c, and 147d may be formed within a groove formed along a lengthwise direction of the first and second lower and upper holders 141a, 141b, 143a, and 143b. Alternatively, and in addition to the conductive layers 147a, 147b, 147c, and 147d, a coating of a conductive material 150 may be formed on the interior surfaces of the recesses 145.

The conductive material 150 may be formed between the conductive layers 147a, 147b, 147c, and 147d and the light emitting lamps 131 to improve electrical contact therebetween, thereby improving efficiency of the light emitting lamps 131. The conductive material 150 may include liquid, gel, and powdered conductive materials, for example.

In FIG. 5B, the exemplary back light device may include a plurality of light emitting lamps 131 each having electrodeless or electrodes formed at opposite ends of outside of a tube, first and second lower holders 141a and 141b spaced apart by a distance to fit to a length of the light emitting lamp 131 each having a plurality of recesses 145 in a surface thereof for receiving the opposite ends of the plurality of the light emitting lamps 131, first and second upper holders 143a and 143b spaced apart by the distance 'L' with the first and the second lower holders 141a and 141b and recesses 145 with the first and the second lower holders 141a and 141b for fastening and holding the light emitting lamps 131 in association with the first and second lower holders 141a and 141b, conductive layers 147a, 147b, 147c, and 147d formed on surfaces the recesses 145 are formed in the holders 141a, 141b, 143a, and 143b, for applying power to the light emitting lamps 131, and an elastic material 155 formed under the conductive layers 147a, 147b, 147c, and 147d.

Figure 6A:
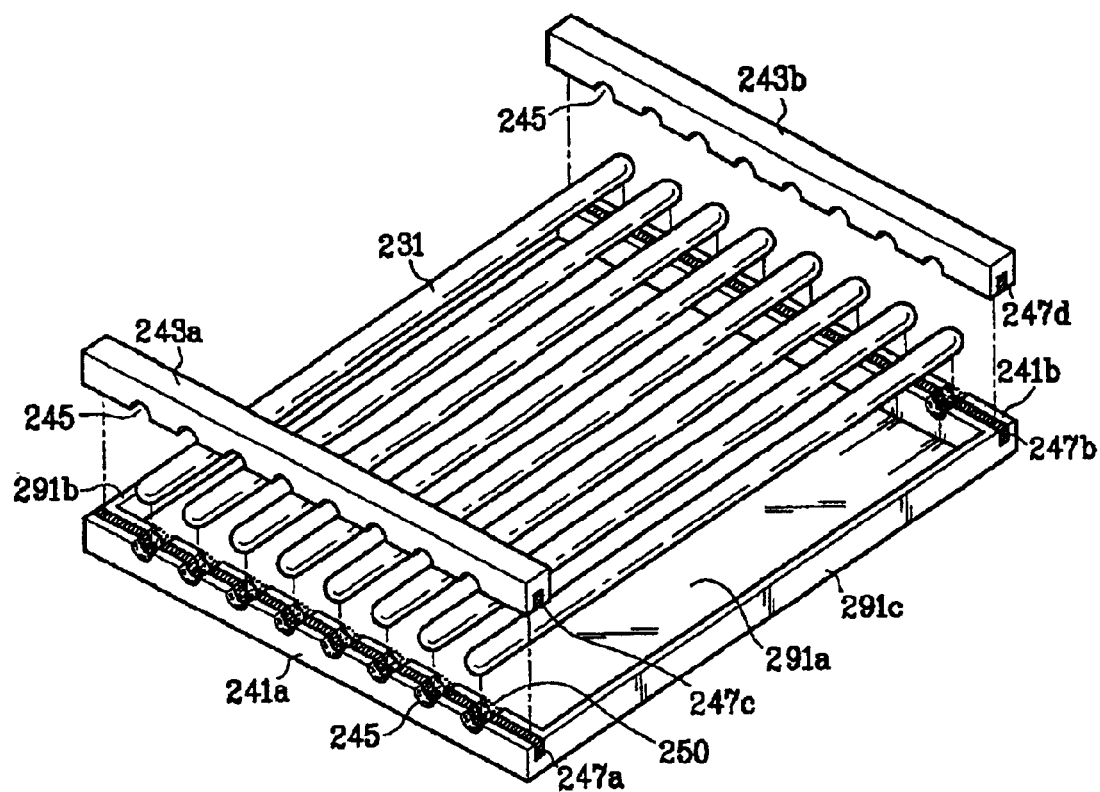
FIGS. 6A and 6B are perspective views of other exemplary back light devices according to the present invention.
Figure 6B:
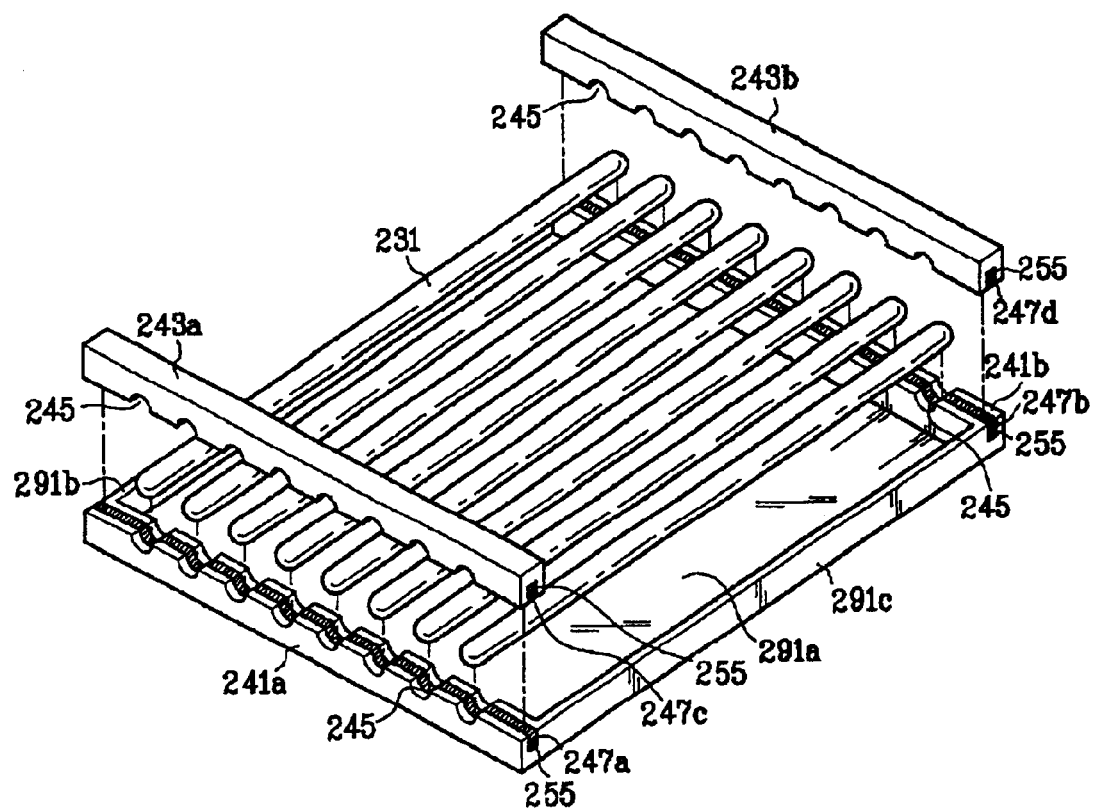

FIGS. 6A and 6B are perspective views of other exemplary back light devices according to the present invention. In FIG. 6A, the back light device may include a plurality of light emitting lamps 231 each having one of an electrodeless or electrodes formed at opposite ends on an outside surface of a tube, first and second lower holders 241a and 241b spaced apart by a first distance to fit to a length of the light emitting lamps 231 having a plurality of recesses 245 formed in one surface thereof for receiving the opposite ends of the plurality of the light emitting lamps 231, lower supporting parts 291a, 291b, and 291c formed between the first and second lower holders 241a and 241b for supporting the first and second lower holders 241a and 241b, first and second upper holders 243a and 243b spaced apart by the first distance with the first and the second lower holders 241a and 241b and the recesses 245 with the first and the second lower holders 241a and 241b for fastening and holding the light emitting lamps 231 in association with the first and second lower holders 241a and 241b, conductive layers 247a, 247b, 247c, and 247d on surfaces the recesses 245 are formed in the holders 241a, 241b, 243a, and 243b, for applying power to the light emitting lamps 231, and a conductive material 250 on the conductive layers 247a, 247b, 247c, and 247d having the recesses 245 formed therein.

In FIG. 6B, the back light device may include a plurality of light emitting lamps 231 each having one of an electrodeless or electrodes formed at opposite ends on an outside surface of a tube, first and second lower holders 241a and 241b spaced apart by a first distance to fit to a length of the light emitting lamp 231 having a plurality of recesses 245 formed in one surface thereof for receiving the opposite ends of the plurality of the light emitting lamps 231, lower supporting parts 291a, 291b, and 291c formed between the first and second lower holders 241a and 241b for supporting the first and second lower holders 241a and 241b, first and second upper holders 243a and 243b spaced apart by the first distance with the first and the second lower holders 241a and 241b and the recesses 245 with the first and the second lower holders 241a and 241b for fastening and holding the light emitting lamps 231 in association with the first and second lower holders 241a and 241b, conductive layers 247a, 247b, 247c, and 247d on surfaces the recesses 245 are formed in the first and second lower and upper holders 241a, 241b, 243a, and 243b, for applying power to the light emitting lamps 231, and an elastic material 255 under the conductive layers 247a, 247b, 247c, and 247d. The recesses 245 of the first and second lower and upper holders 241a, 241b, 243a, and 243b allow the opposite ends of the light emitting lamps 231 to protrude from outer surfaces of the first and second lower and upper holders 241a, 241b, 243a, and 243b. Accordingly, the light emitting lamps 231 may be constrained along a first direction perpendicular to a lengthwise direction of the light emitting lamps 231.

The back light device shown in FIG. 6A has the conductive material 250 on the conductive layers 247a, 247b, 247c, and 247d, whereas the back light device shown in FIG. 6B has the elastic material 255 under the conductive layers 247a, 247b, 247c, and 247d, thereby improving electrical contact between the light emitting lamps 231 and the conductive layers 247a, 247b, 247c, and 247d.

Interior surfaces of the first and second lower holders 241a, and 241b and the lower supporting parts 291a, 291b, and 291c may be formed of a material having an excellent light reflective capability. For an example, the first and second lower holders 241a, and 241b and the lower supporting parts 291a, 291b, and 291c may be formed of a highly reflective plastic material to function as a reflective plate. Alternatively, a reflective material may be coated on the interior surfaces of the first and second lower holders 241a and 241b and the lower supporting parts 291a, 291b, and 291c to focus a light emitted from the light emitting lamps 231 toward the LCD panel.

Figure 7A:
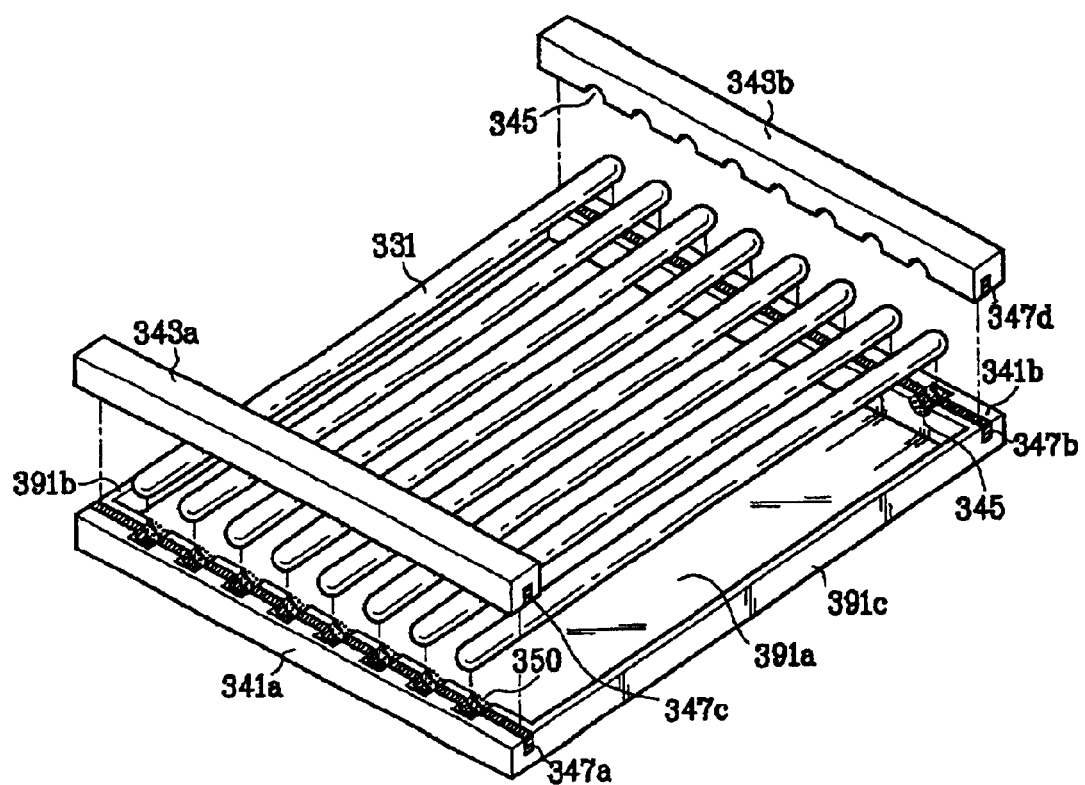
FIGS. 7A and 7B are perspective views of other exemplary back light devices according to the present invention.
Figure 7B:
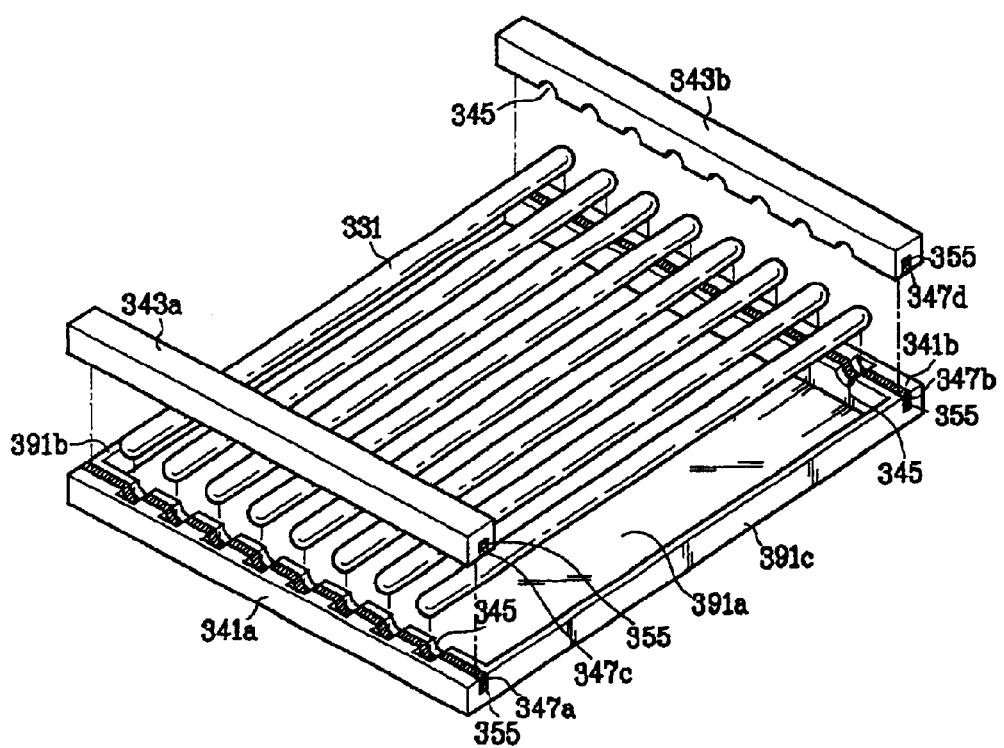

FIGS. 7A and 7B are perspective views of other exemplary back light devices according to the present invention. In FIG. 7A, the back light device may include a plurality of light emitting lamps 331 each having one of an electrodeless or electrodes formed at opposite ends on an outside surface of a tube, first and second lower holders 341a and 341b spaced apart by a first distance to fit to a length of the light emitting lamps 331 having a plurality of recesses 345 formed in one surface thereof for receiving the opposite ends of the plurality of the light emitting lamps 331, lower supporting parts 391a, 391b, and 391c formed between the first and second lower holders 341a and 341b for supporting the first and second lower holders 341a and 341b, first and second upper holders 343a and 343b spaced apart by the first distance with the first and the second lower holders 341a and 341b and the recesses 345 with the first and the second lower holders 341a and 341b for fastening and holding the light emitting lamps 331 in association with the first and second lower holders 341a and 341b, conductive layers 347a, 347b, 347c, and 347d on surfaces the recesses 345 are formed in the holders 341a, 341b, 343a, and 343b, for applying power to the light emitting lamps 331, and a conductive material 350 on the conductive layers 347a, 347b, 347c, and 347d having the recesses 345 formed therein.

In FIG. 7B, the back light device may include a plurality of light emitting lamps 331 each having one of an electrodeless or electrodes formed at opposite ends on an outside surface of a tube, first and second lower holders 341a and 341b spaced apart by a first distance to fit to a length of the light emitting lamp 331 having a plurality of recesses 345 formed in one surface thereof for receiving the opposite ends of the plurality of the light emitting lamps 331, lower supporting parts 391a, 391b, and 391c formed between the first and second lower holders 341a and 341b for supporting the first and second lower holders 341a and 341b, first and second upper holders 343a and 343b spaced apart by the first distance with the first and the second lower holders 341a and 341b and the recesses 345 with the first and the second lower holders 341a and 341b for fastening and holding the light emitting lamps 331 in association with the first and second lower holders 341a and 341b, conductive layers 347a, 347b, 347c, and 347d on surfaces the recesses 345 are formed in the first and second lower and upper holders 341a, 341b, 343a, and 343b, for applying power to the light emitting lamps 331, and an elastic material 355 under the conductive layers 347a, 347b, 347c, and 347d. The recesses 345 partially protrude through the first and second lower and upper holders 341a, 341b, 343a, and 343b, and the opposite ends of the light emitting lamps 331 do not protrude from outer surfaces of the first and second lower and upper holders 341a, 341b, 343a, and 343b. Accordingly, the light emitting lamps 331 may be constrained along a first direction perpendicular to a lengthwise direction of the light emitting lamps 331, and along a second direction parallel to the lengthwise direction of the light emitting lamps 331.

The back light device shown in FIG. 7A has the conductive material 350 on the conductive layers 347a, 347b, 347c, and 347d, whereas the back light device shown in FIG. 7B has the elastic material 355 under the conductive layers 347a, 347b, 347c, and 347d, thereby improving electrical contact between the light emitting lamps 331 and the conductive layers 347a, 347b, 347c, and 347d.

Interior surfaces of the first and second lower holders 341a, and 341b and the lower supporting parts 391a, 391b, and 391c may be formed of a material having an excellent light reflective capability. For an example, the first and second lower holders 341a, and 341b and the lower supporting parts 391a, 391b, and 391c may be formed of a highly reflective plastic material to function as a reflective plate. Alternatively, a reflective material may be coated on the interior surfaces of the first and second lower holders 341a and 341b and the lower supporting parts 391a, 391b, and 391c to focus a light emitted from the light emitting lamps 331 toward the LCD panel.

Figure 8A:
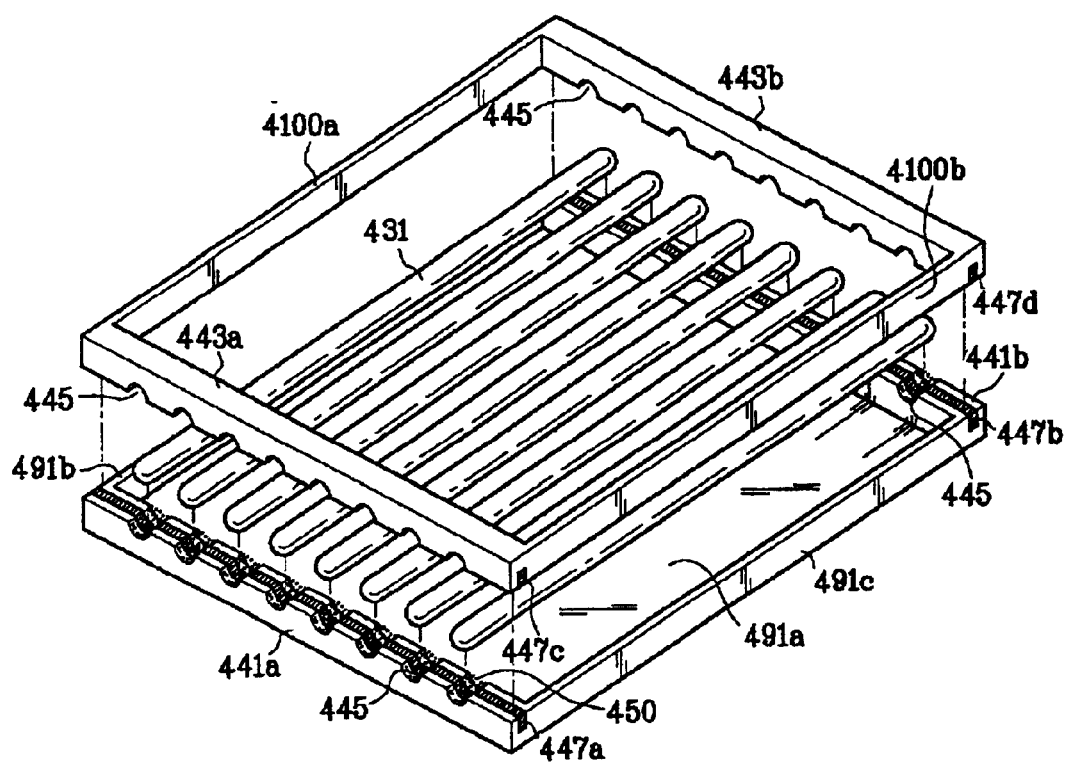
FIGS. 8A and 8B are perspective views of other back light devices according to the present invention.
Figure 8B:
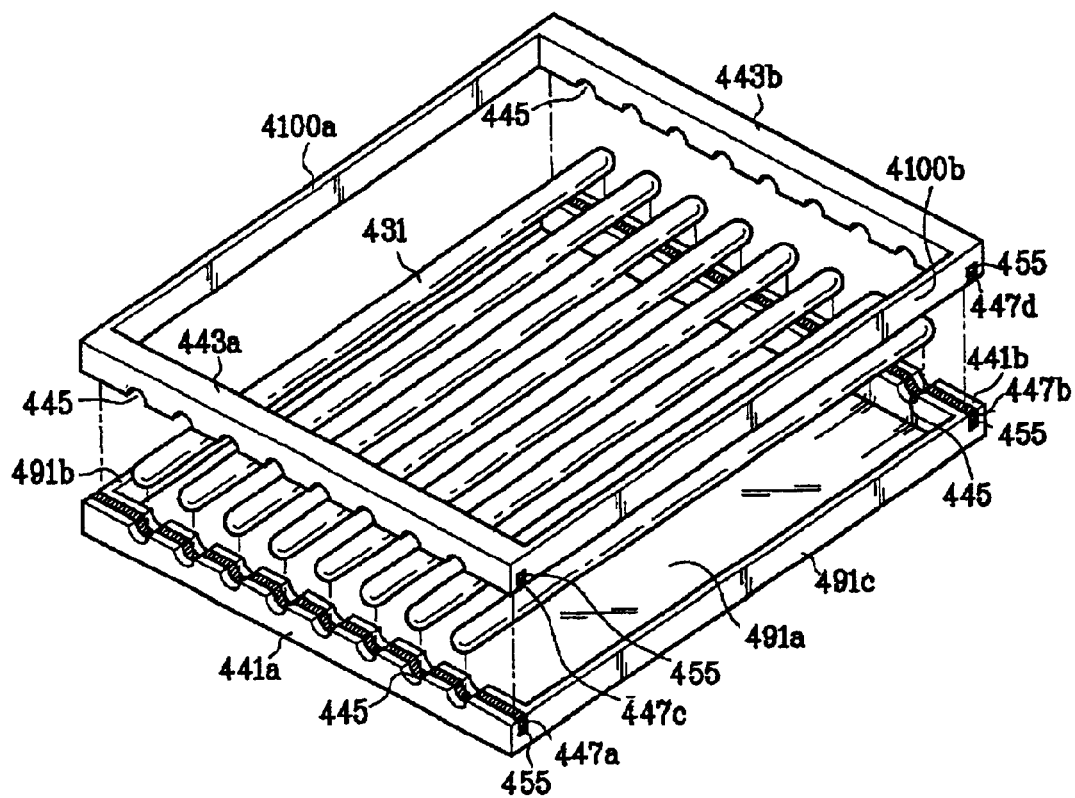

FIGS. 8A and 8B are perspective views of other exemplary back light devices according to the present invention. In FIG. 8A, the back light device may include a plurality of light emitting lamps 431 each having one of an electrodeless or electrodes formed at opposite ends on an outside surface of a tube, first and second lower holders 441a and 441b spaced apart by a first distance to fit to a length of the light emitting lamps 431 having a plurality of recesses 445 formed in one surface thereof for receiving the opposite ends of the plurality of the light emitting lamps 431, lower supporting parts 491a, 491b, and 491c formed between the first and second lower holders 441a and 441b for supporting the first and second lower holders 441a and 441b, first and second upper holders 443a and 443b spaced apart by the first distance with the first and the second lower holders 441a and 441b and the recesses 445 with the first and the second lower holders 441a and 441b for fastening and holding the light emitting lamps 431 in association with the first and second lower holders 441a and 441b, upper supporting parts 4100a and 4100b are connected to opposite sides of the first and second upper holders 443a and 443b within a range so as not to cut-off any light emitted from the light emitting lamps 431, conductive layers 447a, 447b, 447c, and 447d on surfaces the recesses 445 are formed in the first and second lower and upper holders 441a, 441b, 443a, and 443b, for applying power to the light emitting lamps 431, and a conductive material 450 on the conductive layers 447a, 447b, 447c, and 447d having the recesses 445 formed therein.

In FIG. 8B, the back light device may include a plurality of light emitting lamps 431 each having one of an electrodeless or electrodes formed at opposite ends on an outside surface of a tube, first and second lower holders 441a and 441b spaced apart by a first distance to fit to a length of the light emitting lamp 431 having a plurality of recesses 445 formed in one surface thereof for receiving the opposite ends of the plurality of the light emitting lamps 431, lower supporting parts 491a, 491b, and 491c formed between the first and second lower holders 441a and 441b for supporting the first and second lower holders 441a and 441b, first and second upper holders 443a and 443b spaced apart by the first distance with the first and the second lower holders 441a and 441b and the recesses 445 with the first and the second lower holders 441a and 441b for fastening and holding the light emitting lamps 431 in association with the first and second lower holders 441a and 441b, upper supporting parts 4100a and 4100b are connected to opposite sides of the first and second upper holders 443a and 443b so as not to cut-off any light emitted from the light emitting lamps 431, conductive layers 447a, 447b, 447c, and 447d on surfaces the recesses 445 are formed in the first and second lower and upper holders 441a, 441b, 443a, and 443b, for applying power to the light emitting lamps 431, and an elastic material 455 under the conductive layers 447a, 447b, 447c, and 447d. The recesses 445 of the first and second lower and upper holders 441a, 441b, 443a, and 443b allow the opposite ends of the light emitting lamps 431 to protrude from outer surfaces of the first and second lower and upper holders 441a, 441b, 443a, and 443b. Accordingly, the light emitting lamps 431 may be constrained along a first direction perpendicular to a lengthwise direction of the light emitting lamps 431.

The back light device shown in FIG. 8A has the conductive material 450 on the conductive layers 447a, 447b, 447c, and 447d, whereas the back light device shown in FIG. 8B has the elastic material 455 under the conductive layers 447a, 447b, 447c, and 447d, thereby improving electrical contact between the light emitting lamps 431 and the conductive layers 447a, 447b, 447c, and 447d.

Interior surfaces of the first and second lower holders 441a, and 441b, the lower supporting parts 491a, 491b, and 491c, and the upper supporting parts 4100a and 4100b may be formed of a material having an excellent light reflective capability. For an example, the first and second lower holders 441a, and 441b, the lower supporting parts 491a, 491b, and 491c, and the upper supporting parts 4100a and 4100b may be formed of a highly reflective plastic material to function as a reflective plate. Alternatively, a reflective material may be coated on the interior surfaces of the first and second lower holders 441a and 441b, the lower supporting parts 491a, 491b, and 491c, and the upper supporting parts 4100a and 4100b to focus a light emitted from the light emitting lamps 431 toward the LCD panel.

Figure 9A:
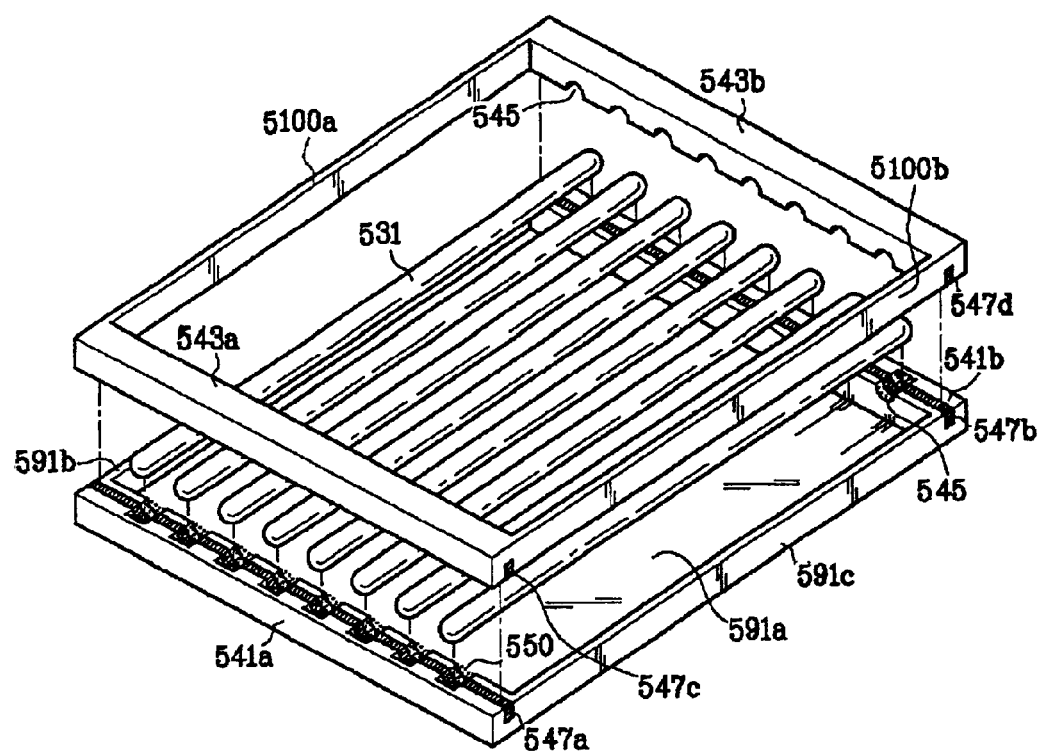
FIGS. 9A and 9B are perspective views of other exemplary back light devices according to the present invention.
Figure 9B:
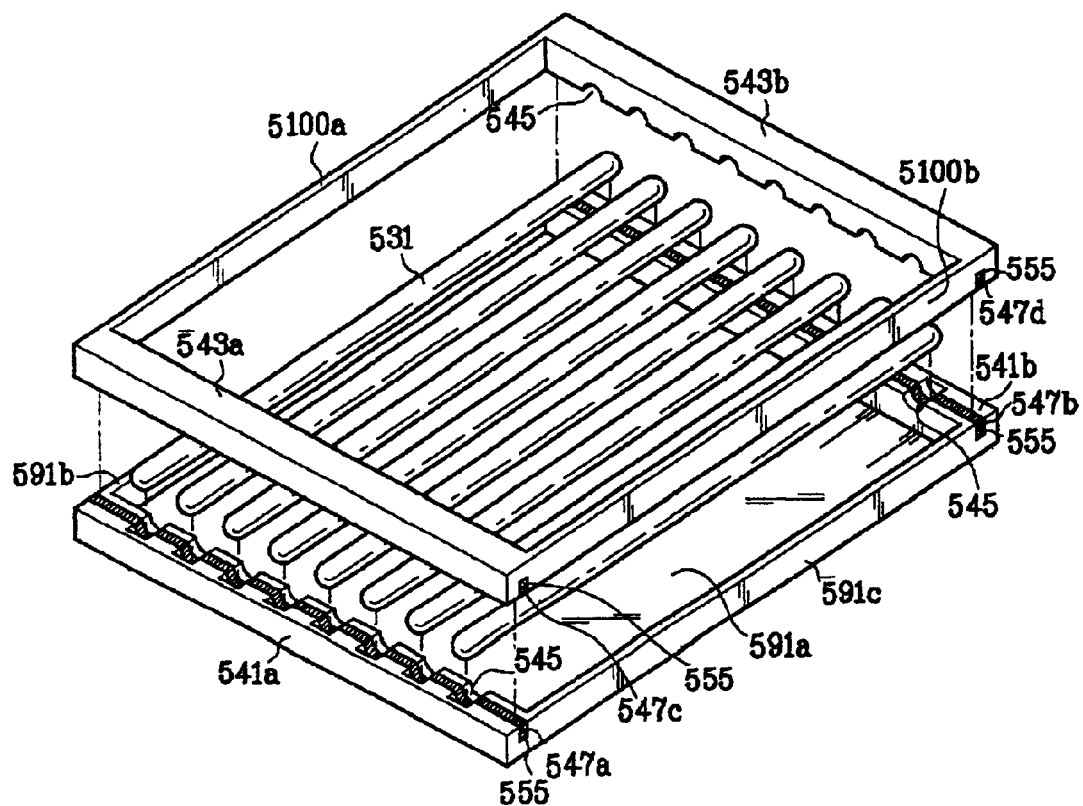

FIGS. 9A and 9B are perspective views of other exemplary back light devices according to the present invention. In FIG. 9A, the back light device may include a plurality of light emitting lamps 531 each having one of an electrodeless or electrodes formed at opposite ends on an outside surface of a tube, first and second lower holders 541a and 541b spaced apart by a first distance to fit to a length of the light emitting lamps 531 having a plurality of recesses 545 formed in one surface thereof for receiving the opposite ends of the plurality of the light emitting lamps 531, lower supporting parts 591a, 591b, and 591c formed between the first and second lower holders 541a and 541b for supporting the first and second lower holders 541a and 541b, first and second upper holders 543a and 543b spaced apart by the first distance with the first and the second lower holders 541a and 541b and the recesses 545 with the first and the second lower holders 541a and 541b for fastening and holding the light emitting lamps 531 in association with the first and second lower holders 541a and 541b, upper supporting parts 5100a and 5100b are connected to opposite sides of the first and second upper holders 543a and 543b within a range so as not to cut-off any light emitted from the light emitting lamps 531, conductive layers 547a, 547b, 547c, and 547d on surfaces the recesses 545 are formed in the holders 541a, 541b, 543a, and 543b, for applying power to the light emitting lamps 531, and a conductive material 550 on the conductive layers 547a, 547b, 547c, and 547d having the recesses 545 formed therein.

In FIG. 9B, the back light device may include a plurality of light emitting lamps 531 each having one of an electrode-less or electrodes formed at opposite ends on an outside surface of a tube, first and second lower holders 541a and 541b spaced apart by a first distance to fit to a length of the light emitting lamp 531 having a plurality of recesses 545 formed in one surface thereof for receiving the opposite ends of the plurality of the light emitting lamps 531, lower supporting parts 591a, 591b, and 591c formed between the first and second lower holders 541a and 541b for supporting the first and second lower holders 541a and 541b, first and second upper holders 543a and 543b spaced apart by the first distance with the first and the second lower holders 541a and 541b and the recesses 545 with the first and the second lower holders 541a and 541b for fastening and holding the light emitting lamps 531 in association with the first and second lower holders 541a and 541b, upper supporting parts 5100a and 5100b are connected to opposite sides of the first and second upper holders 543a and 543b within a range so as not to cut-off any light emitted from the light emitting lamps 531, conductive layers 547a, 547b, 547c, and 547d on surfaces the recesses 545 are formed in the first and second lower and upper holders 541a, 541b, 543a, and 543b, for applying power to the light emitting lamps 531, and an elastic material 555 under the conductive layers 547a, 547b, 547c, and 547d. The recesses 545 partially protrude through the first and second lower and upper holders 541a, 541b, 543a, and 543b, and the opposite ends of the light emitting lamps 531 do not protrude from outer surfaces of the first and second lower and upper holders 541a, 541b, 543a, and 543b. Accordingly, the light emitting lamps 531 may be constrained along a first direction perpendicular to a lengthwise direction of the light emitting lamps 531, and along a second direction parallel to the lengthwise direction of the light emitting lamps 531.

The back light device shown in FIG. 9A has the conductive material 550 on the conductive layers 547a, 547b, 547c, and 547d, whereas the back light device shown in FIG. 9B has the elastic material 555 under the conductive layers 547a, 547b, 547c, and 547d, thereby improving electrical contact between the light emitting lamps 531 and the conductive layers 547a, 547b, 547c, and 547d.

Interior surfaces of the first and second lower holders 541a, and 541b, the lower supporting parts 591a, 591b, and 591c, and the upper supporting parts 5100a and 5100b may be formed of a material having an excellent light reflective capability. For an example, the first and second lower holders 541a, and 541b, the lower supporting parts 591a, 591b, and 591c, and the upper supporting parts 5100a and 5100b may be formed of a highly reflective plastic material to function as a reflective plate. Alternatively, a reflective material may be coated on the interior surfaces of the first and second lower holders 541a and 541b, the lower supporting parts 591a, 591b, and 591c, and the upper supporting parts 5100a and 5100b to focus a light emitted from the light emitting lamps 531 toward the LCD panel.

It will be apparent to those skilled in the art that various modifications and variations can be made in the back light device of the present invention without departing from the spirit or scope of the invention. Thus, it is intended that the present invention cover the modifications and variations of this invention provided they come within the scope of the appended claims and their equivalents.

What is claimed is:

1. A back light device, comprising:
   a plurality of light emitting lamps;
   upper and lower holders having a plurality of recesses in opposing surfaces for receiving opposite ends of each the plurality of light emitting lamps;
   conductive layers on the opposing surfaces of the upper and lower holders for supplying power to opposite ends of the light emitting lamps;
   a conductive material on the conductive layers; and
   a light diffusion system over the upper holders.

2. The device according to claim 1, wherein the upper and lower holders are detachable from each other.

3. The device according to claim 1, wherein the conductive layer is formed upon at least one of opposing surfaces of the opposing upper and lower holders.

4. The device according to claim 1, wherein the conductive material includes one of liquid, gel, and powdered materials.

5. The device according to claim 1, wherein each of the plurality of light emitting lamps have electrodes on outer surfaces at the opposite ends.

6. The device according to claim 1, wherein each of the plurality of light emitting lamps have electrodes on inner surfaces at the opposite ends.

7. A back light device, comprising:
   a plurality of light emitting lamps;
   upper and lower holders having a plurality of recesses in opposing surfaces for receiving the plurality of light emitting lamps;
   conductive layers on the opposing surfaces of the upper and lower holders for supplying power to the light emitting lamps;
   an elastic material under the conductive layers; and
   a light diffusion system over the upper holders.

8. The device according to claim 7, wherein the upper and lower holders are detachable from each other.

9. The device according to claim 7, wherein the conductive layer is formed on at least one of the opposing surfaces of the upper and lower holders.

10. The device according to claim 7, wherein each of the plurality of light emitting lamps have electrodes on outer surfaces at the opposite ends.

11. The device according to claim 7, wherein each of the plurality of light emitting lamps have electrodes on inner surfaces at the opposite ends.

12. A back light device, comprising:

a plurality of light emitting lamps;

first and second lower holders arranged a first distance apart from each other to fit to a length of the light emitting lamps, each of the first and second lower holders having a first plurality of recesses for receiving opposite ends of the plurality of light emitting lamps;

first and second upper holders arranged the first distance apart from each other, each of the first and second upper holders having a second plurality of recesses corresponding to the first plurality of recesses for fastening and holding the opposite ends of the light emitting lamps together with the first and second lower holders;

conductive layers on opposing surfaces of the first and second lower and upper holders for supplying power to the light emitting lamps; and a conductive material on the conductive layers.

13. The device according to claim 12, wherein the recesses are formed to pass completely through the first and second lower and upper holders.

14. The device according to claim 12, wherein the recesses are formed to pass partially through an outside portion of the first and second lower and upper holders.

15. The device according to claim 12, wherein the conductive layer includes a conductive material formed within a longitudinal groove of each of the first and second lower and upper holders.

16. The device according to claim 12, wherein the conductive layer includes a conductive material coated along a longitudinal surface of each of the first and second lower and upper holders.

17. The device according to claim 12, further including a light diffusing system over the first and second upper holders.

18. The device according to claim 12, wherein the conductive material includes one of a liquid, gel, and powdered material.

19. The device according to claim 12, further including an elastic material under the conductive layers.

20. The device according to claim 12, wherein each of the plurality of light emitting lamps have electrodes on outer surfaces at the opposite ends.

21. The device according to claim 12, wherein each of the plurality of light emitting lamps have electrodes on inner surfaces at the opposite ends.

22. A back light device, comprising:

a plurality of light emitting lamps;

first and second lower holders arranged a first distance apart from each other to fit to a length of the light emitting lamps, each of the first and second lower holders having a first plurality of recesses for receiving opposite ends of the plurality of light emitting lamps;

first and second upper holders arranged the first distance apart from each other, each of the first and second upper holders having a second plurality of recesses corresponding to the first plurality of recesses for fastening and holding the opposite ends of the light emitting lamps together with the first and second lower holders;

conductive layers on opposing surfaces of the first and second lower and upper holders for supplying power to the light emitting lamps; and an elastic material under the conductive layers.

23. The device according to claim 22, wherein the first and second pluralities of recesses are formed to pass completely through the first and second lower and upper holders.

24. The device according to claim 22, wherein the first and second pluralities of recesses are formed to pass partially through an outside portion of the first and second lower and upper holders.

25. The device according to claim 22, wherein the conductive layer includes a conductive material formed within a longitudinal groove of each of the first and second lower and upper holders.

26. The device according to claim 22, wherein the conductive layer includes a conductive material coated along a longitudinal surface of each of the first and second lower and upper holders.

27. The device according to claim 22, further including a light diffusing system over the first and second upper holders.

28. The device according to claim 22, wherein each of the plurality of light emitting lamps have electrodes on outer surfaces at the opposite ends.

29. The device according to claim 22, wherein each of the plurality of light emitting lamps have electrodes on inner surfaces at the opposite ends.

30. A back light device, comprising:

a plurality of light emitting lamps;

first and second lower holders arranged a first distance apart from each other to fit to a length of the light emitting lamps, each of the first and second lower holders having a first plurality of recesses for receiving opposite ends of the plurality of light emitting lamps;

lower supporting parts formed between the first and second lower holders for supporting the first and second lower holders;

first and second upper holders arranged the first distance apart from each other, each of the first and second upper holders having a second plurality of recesses corresponding to the first plurality of recesses for fastening and holding the light emitting lamps together with the first and second lower holders;

conductive layers on opposing surfaces of the first and second lower and upper holders for supplying power to the light emitting lamps; and a conductive material on the conductive layers.

31. The device according to claim 30, wherein the first and second pluralities of recesses are formed to pass completely through the first and second lower and upper holders.

32. The device according to claim 30, wherein the first and second pluralities of recesses are formed to pass partially through an outside portion of the first and second lower and upper holders.

33. The device according to claim 30, wherein the conductive layer includes a conductive material formed within a longitudinal groove of each of the first and second lower and upper holders.

34. The device according to claim 30, wherein the conductive layer includes a conductive material coated along a longitudinal surface of each of the first and second lower and upper holders.

35. The device according to claim 30, further including a light diffusion system over the first and second upper holders.

36. The device according to claim 30, wherein the conductive material includes one of a liquid, gel, and powdered material.

37. The device according to claim 30, wherein the lower supporting parts are formed of a light reflective material.

38. The device according to claim 30, wherein interior surfaces of the lower supporting parts are coated with a light reflective material.

39. The device according to claim 30, further including upper supporting parts at ends of the first and second upper holders for supporting the first and second upper holders.

40. The device according to claim 30, further including an elastic material under the conductive layers.

41. A back light device, comprising:

a plurality of light emitting lamps;

first and second lower holders arranged a first distance apart from each other to fit to a length of the light emitting lamps, each of the first and second lower holders having a first plurality of recesses for receiving opposite ends of the plurality of light emitting lamps;

lower supporting parts formed between the first and second lower holders for supporting the first and second lower holders;

first and second upper holders arranged the first distance apart from each other, each of the first and second upper holders having a second plurality of recesses corresponding to the first plurality of recesses for fastening and holding the light emitting lamps together with the first and second lower holders;

conductive layers on opposing surfaces of the first and second lower and upper holders for supplying power to the light emitting lamps; and an elastic material under the conductive layers.

42. The device according to claim 41, wherein the first and second pluralities of recesses are formed to pass completely through the first and second lower and upper holders.

43. The device according to claim 41, wherein the first and second pluralities of recesses are formed to pass partially through an outside portion of the first and second lower and upper holders.

44. The device according to claim 41, wherein the conductive layer includes a conductive material formed within a longitudinal groove of each of the first and second lower and upper holders.

45. The device according to claim 41, wherein the conductive layer includes a conductive material coated along a longitudinal surface of each of the first and second lower and upper holders.

46. The device according to claim 41, further including a light diffusion system over the first and second upper holders.

47. The device according to claim 41, wherein the lower supporting parts are formed of a light reflective material.

48. The device according to claim 41, wherein interior surfaces of the lower supporting parts are coated with a light reflective material.

49. The device according to claim 41, further including upper supporting parts at ends of the first and second upper holders for supporting the first and second upper holders.

* * * * *